(12) United States Patent
Baines et al.

(10) Patent No.: US 11,712,127 B2
(45) Date of Patent: Aug. 1, 2023

(54) CURTAIN AND HOOK ASSEMBLIES

(71) Applicant: Maytex Mills, Inc., New York, NY (US)

(72) Inventors: David M. Baines, Bedford, NY (US); David Harry Engell, Stamford, CT (US)

(73) Assignee: Maytex Mills, Inc., New York, NY (US)

( * ) Notice: Subject to any disclaimer, the term of this patent is extended or adjusted under 35 U.S.C. 154(b) by 0 days.

(21) Appl. No.: 15/951,550

(22) Filed: Apr. 12, 2018

(65) Prior Publication Data
US 2018/0296018 A1    Oct. 18, 2018

Related U.S. Application Data

(60) Provisional application No. 62/485,086, filed on Apr. 13, 2017.

(51) Int. Cl.
| | | |
|---|---|---|
| *A47H 13/04* | (2006.01) | |
| *A47K 3/38* | (2006.01) | |
| *F16B 21/12* | (2006.01) | |
| *F16B 13/08* | (2006.01) | |

(52) U.S. Cl.
CPC ............ *A47H 13/04* (2013.01); *A47K 3/38* (2013.01); *F16B 13/0858* (2013.01); *F16B 21/12* (2013.01)

(58) Field of Classification Search
CPC ........ A47H 13/04; A47H 13/00; A47H 13/01; A47H 13/02; A47H 13/16; A47H 15/00; A47H 15/04; A47H 19/00; A47H 15/002; A47K 3/38; E05D 15/0621; E05D 15/0626; E05D 15/0643; E05D 2015/1026

USPC .......................................................... 24/716
See application file for complete search history.

(56) References Cited

U.S. PATENT DOCUMENTS

| | | | |
|---|---|---|---|
| 3,444,595 A * | 5/1969 | Wachenheimer | A47H 13/04 |
| | | | 24/369 |
| 6,698,061 B2 | 3/2004 | Ho | |
| 7,003,848 B2 | 2/2006 | Ho | |
| 8,381,374 B2 * | 2/2013 | Henry | A47K 3/38 |
| | | | 160/330 |
| 9,107,544 B2 * | 8/2015 | Cittadino | A47H 13/02 |
| 9,578,995 B2 * | 2/2017 | Hanley | A47H 13/04 |
| 9,788,675 B1 * | 10/2017 | Hodgdon | A47K 3/38 |
| 9,869,424 B1 * | 1/2018 | Forrest | A47H 1/022 |

(Continued)

FOREIGN PATENT DOCUMENTS

| | | |
|---|---|---|
| CN | 201840285 U | 5/2011 |
| CN | 103654249 A | 3/2014 |

OTHER PUBLICATIONS

The International Search Report and the Written Opinion of the International Searching Authority for PCT/US2018/02731, 11 pages.

*Primary Examiner* — Daniel P Cahn
*Assistant Examiner* — Jeremy C Ramsey
(74) *Attorney, Agent, or Firm* — Alan G. Towner; Leech Tishman Fuscaldo & Lampl

(57) ABSTRACT

Curtain hook assemblies are disclosed that include backing plates secured to a curtain and curtain hooks rotatably mounted on the backing plates. The curtain hooks can rotate from flat positions against the curtain during packaging to extended positions for hanging on a curtain rod. A lower hook may optionally be integrally or rotatably attached to the backing plate.

17 Claims, 10 Drawing Sheets

(56) References Cited

U.S. PATENT DOCUMENTS

| | | | |
|---|---|---|---|
| 10,264,908 B2 * | 4/2019 | Hatton | A47H 13/00 |
| 2011/0088231 A1 * | 4/2011 | Henry | F16B 45/00 24/716 |

* cited by examiner

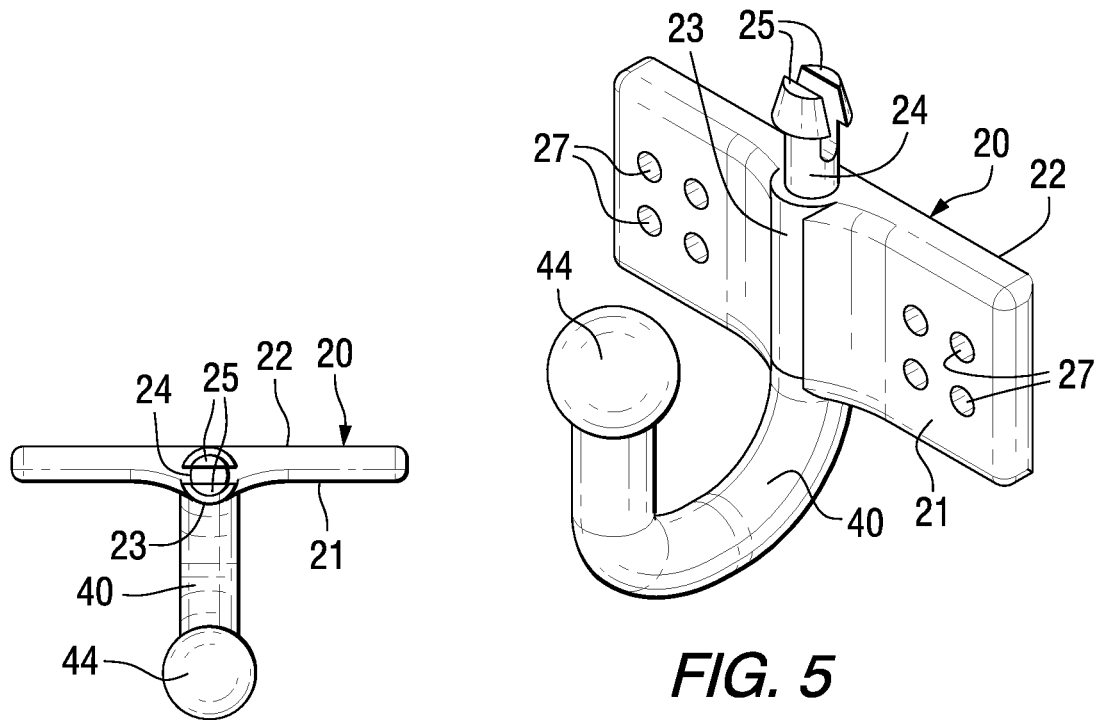
FIG. 5
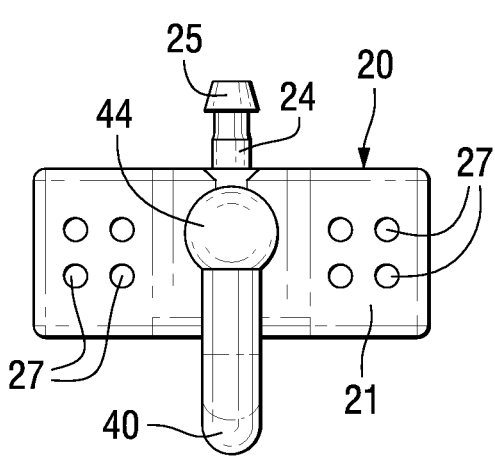
FIG. 8
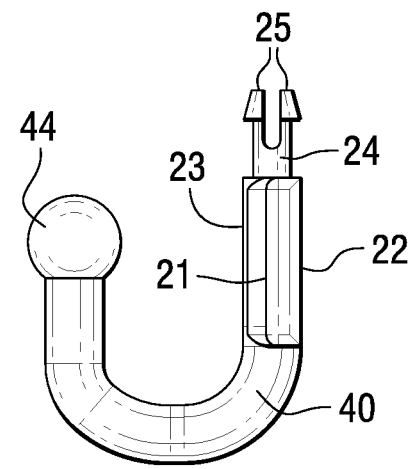
FIG. 6
FIG. 7

CURTAIN AND HOOK ASSEMBLIES

CROSS-REFERENCE TO RELATED APPLICATION

This application claims priority from U.S. Provisional Application No. 62/485,086 filed Apr. 13, 2017, which is incorporated herein by reference.

FIELD OF THE INVENTION

The present invention is related to curtain hook assemblies, and more particularly is related to hooks that are attached to window curtains or shower curtains.

BACKGROUND INFORMATION

Most window curtains, shower curtains and shower liners are sold separately from the curtain hooks. This creates the chore of assembling the curtains onto the hooks prior to installing the combination onto a curtain rod or shower rod.

SUMMARY OF THE INVENTION

The present invention provides hook assemblies that are attached to curtains, and which can rotate from flat positions against the curtain during packaging to extended positions for hanging on a curtain rod. An upper curtain hook is rotatably mounted on a backing plate that is secured to the curtain. A lower hook may optionally be integrally or rotatably attached to the backing plate.

An aspect of the present invention is to provide a curtain and hook assembly comprising a curtain, a backing plate secured to the curtain, and a curtain hook rotatably mounted on and extending upward from the backing plate, wherein the curtain hook is rotatable from a retracted position in which a plane defined by the curtain hook is substantially parallel with a plane defined by the curtain to an extended position in which the plane defined by the curtain hook is substantially perpendicular to the plane defined by the curtain.

Another aspect of the present invention is to provide a curtain hook for securing to a curtain comprising a backing plate having a back face structured and arranged to contact the curtain and an upwardly extending connecting pin, and a curtain hook rotatably mounted on the backing plate comprising a retaining cup adjacent a bottom portion of the curtain hook, wherein the connecting pin is received within the retaining cup to allow the curtain hook to rotate around an axis defined by the connecting pin and to retain the curtain hook from relative movement with respect to the backing plate along the axis of the connecting pin.

These and other aspects of the present invention will be more apparent from the following description.

BRIEF DESCRIPTION OF THE DRAWINGS

FIG. 5 is an isometric view of a backing plate including a lower liner hook in accordance with an embodiment of the present invention.

FIG. 6 is a front view of the backing plate of FIG. 5.

FIG. 7 is a side view of the backing plate of FIG. 5.

FIG. 8 is a top view of the backing plate of FIG. 5.

DETAILED DESCRIPTION

The present invention provides curtain hook assemblies that may be attached to window or shower curtains. In certain embodiments, the hooks may be pre-assembled and packaged together with a curtain for sale and use. In other embodiments, the hooks may be provided separately from the shower curtain for assembly by the user.

Figure 1:
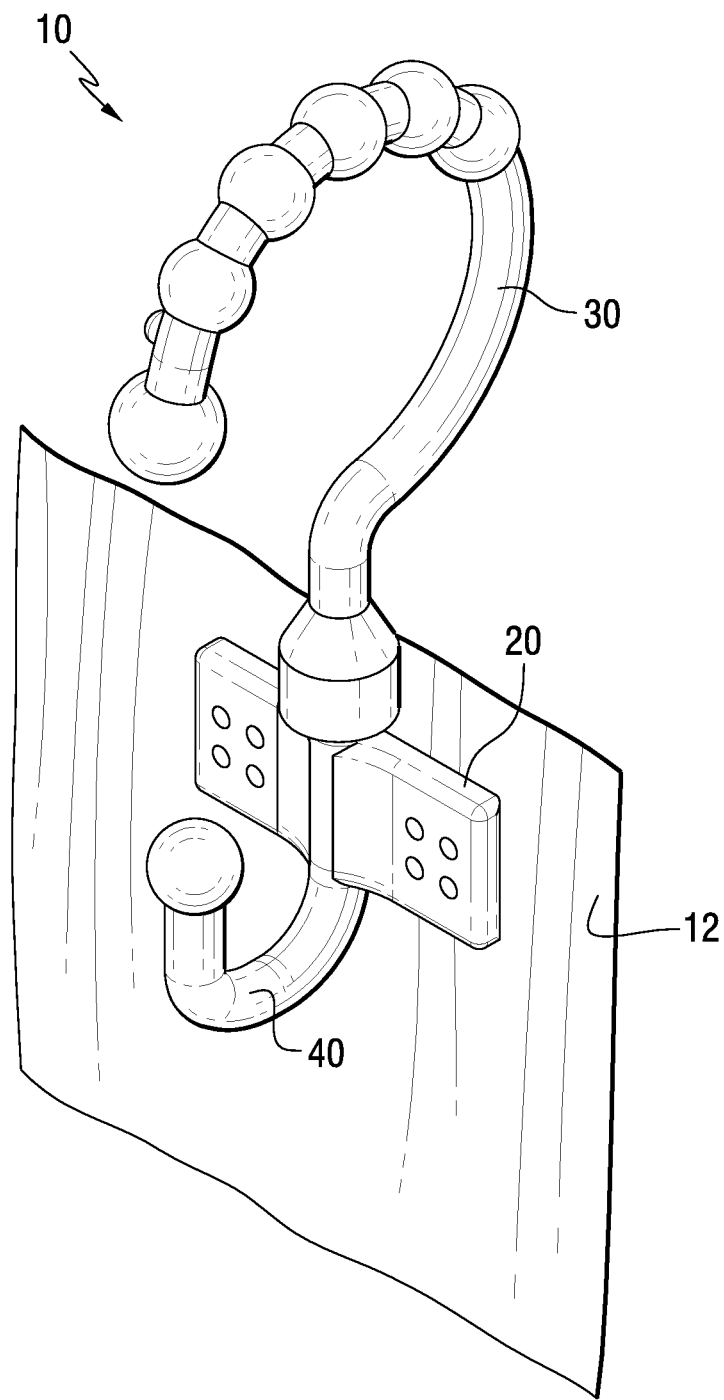
FIG. 1 is an isometric view of a curtain hook assembly in accordance with an embodiment of the present invention.
Figure 4:
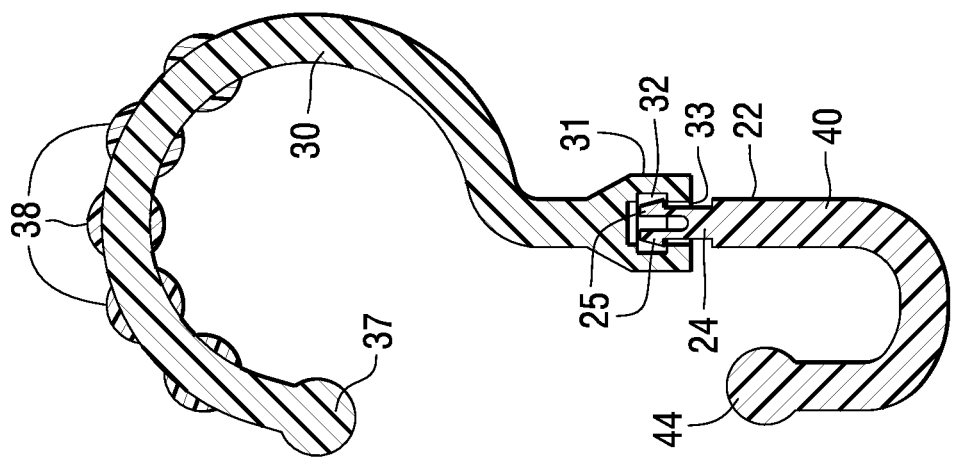
FIG. 4 is a sectional view taken through Section 4-4 of FIG. 2.
Figure 3:
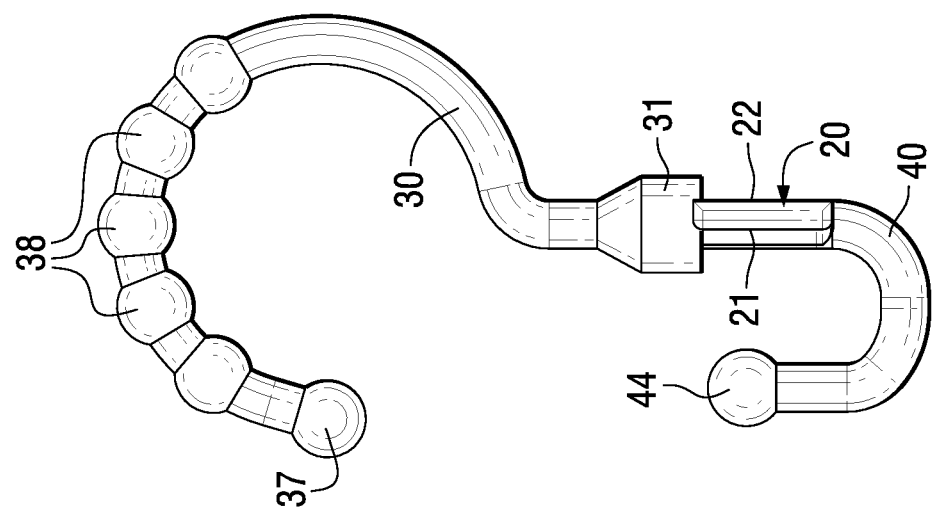
FIG. 3 is a side view of the backing plate and curtain hook of FIG. 2.
Figure 2:
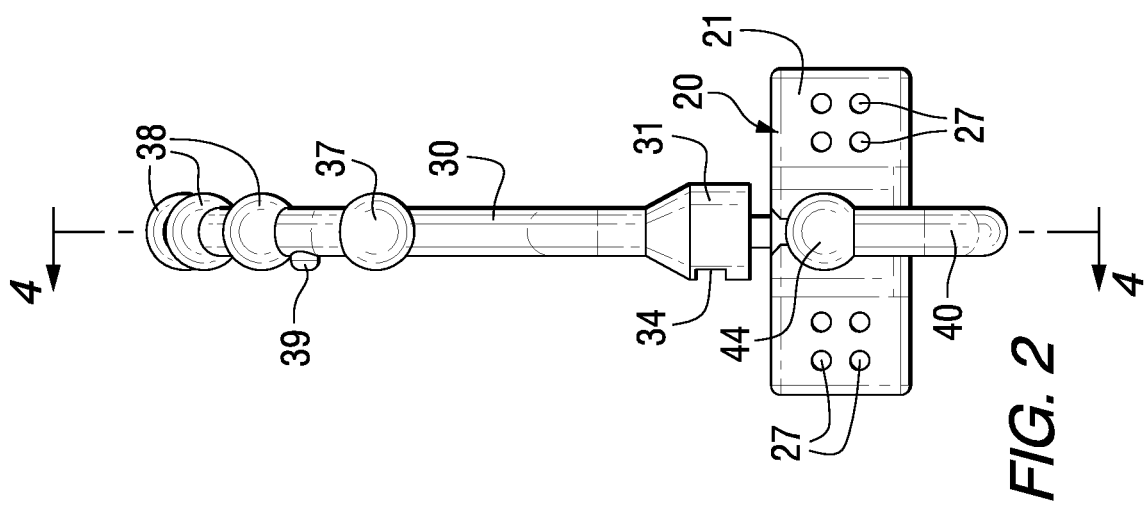
FIG. 2 is a front view of a curtain hook including a backing plate and rotatable curtain hook for use in a curtain hook assembly in accordance with an embodiment of the present invention.
Figure 11:
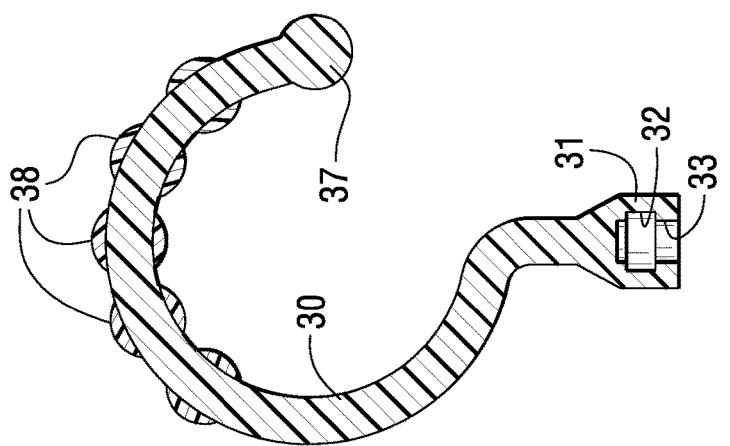
FIG. 11 is a sectional view taken through Section 10-10 of FIG. 10.
Figure 10:
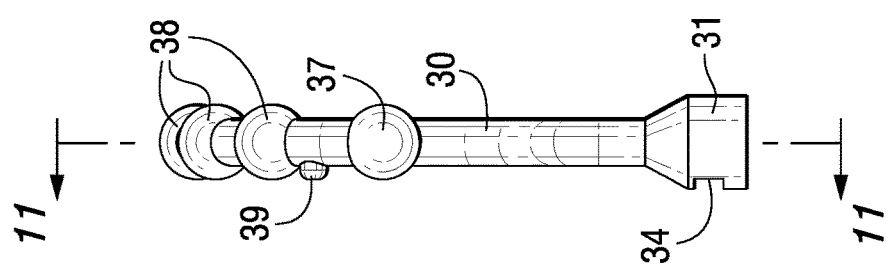
FIG. 10 is a front view of the curtain hook of FIG. 9.
Figure 9:
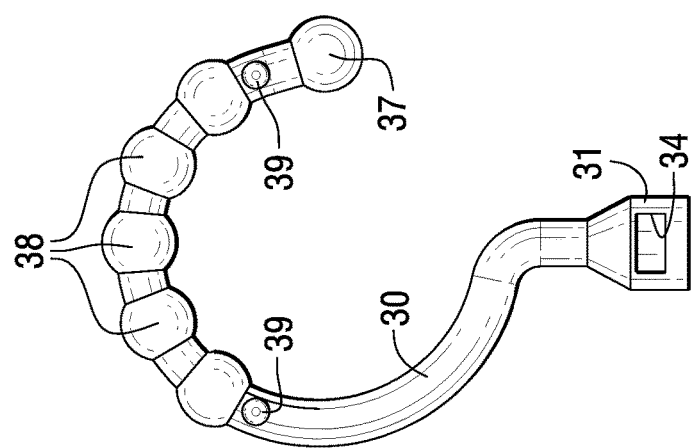
FIG. 9 is a side view of an upper curtain hook for use in a curtain hook assembly in accordance with an embodiment of the present invention.
Figure 12:
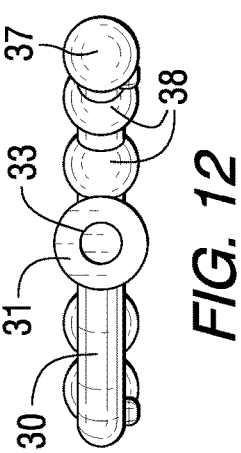
FIG. 12 is a bottom view of the curtain hook of FIG. 9.

FIGS. 1-12 illustrate features of a curtain hook assembly 10 in accordance with an embodiment of the present invention. As shown in FIG. 1, the curtain hook assembly 10 includes a shower curtain or window curtain 12, a backing plate 20, curtain hook 30 and a lower hook 40. The curtain 12 may be of any suitable construction and may be made of any suitable material conventionally used for window curtains, window curtain liners, shower curtains and shower curtain liners, including fabric and polymeric sheets.

As shown in FIGS. 2-8, the backing plate 20 includes a front face 21, back face 22 and vertical support rib 23 on the front face 21. The backing plate 20 may be secured to the curtain 12 by any suitable means such as sewing, mechanical fasteners, conventional adhesives, and the like. A connecting pin 24 extends upward from the backing plate 20 and includes opposing resilient securement tabs 25. In the embodiment shown, mounting holes 27 are provided through the backing plate 20 in order to sew or otherwise secure the backing plate 20 onto the curtain 12. A lower hook 40 extends downward from the backing plate 20 and has a lower hook end 44. In the embodiment shown, the lower hook 40 is integrally formed with the backing plate 20. However, as described in more detail below, a lower hook may be rotatably mounted on a backing plate in certain embodiments.

As shown in FIGS. 2-12, the connecting pin 24 and resilient securement tabs 25 of the backing plate 20 are inserted into a retaining cup 31 at the bottom of the curtain hook 30. The retaining cup 31 includes a tab-receiving interior region 32 and a restricted opening 33 at the bottom of the cup 31. A side opening 34 is provided in the side of the retaining cup 31, which may be used to access the resilient securement tabs 25 if removal from the retaining cup 31 is desired and/or to facilitate manufacture of the retaining cup 31 and hook 30, e.g., during injection molding thereof.

The curtain hook 30 includes an end 37, roller balls 38 and retainers 39 for retaining the roller balls 38 on the curtain hook 30, as shown in FIGS. 2-4 and 9-12. Although ball rollers are shown, it is to be understood that any other suitable roller shape such as cylinders or barrels may be used, or the rollers may be eliminated.

In the embodiment shown in FIGS. 1-12, the curtain hook 30 is rotatably mounted on the backing plate 20 through engagement of the connecting pin 24 and securement tabs 25 within the retaining cup 31. As shown most clearly in FIG. 4, the resilient securement tabs 25 are located within the tab-receiving interior region 32 of the retaining cup 31, and are resiliently secured by means of the restricted opening 33 at the bottom of the retaining cup 31. When the curtain hook 30 is secured onto a curtain rod (not shown), the curtain hook 30 may be oriented as shown in FIG. 1. The curtain hook 30 is movable to the position shown in FIG. 1 from a position in which the curtain hook 30 lies flat against or in a plane parallel to the curtain 12. For example, the curtain hook 30 may be packaged in a flat position with respect to the curtain 12, and then rotated 90° to the position shown in FIG. 1 for attachment to a curtain rod. When installed, the lower hook 40 may be used to hang a shower curtain liner (not shown) in the case where the curtain 12 is a shower curtain. Alternatively, where the curtain 12 is a window curtain, a window curtain liner (not shown) may be hung from the lower hook 40 to provide additional room darkening.

Figure 13:
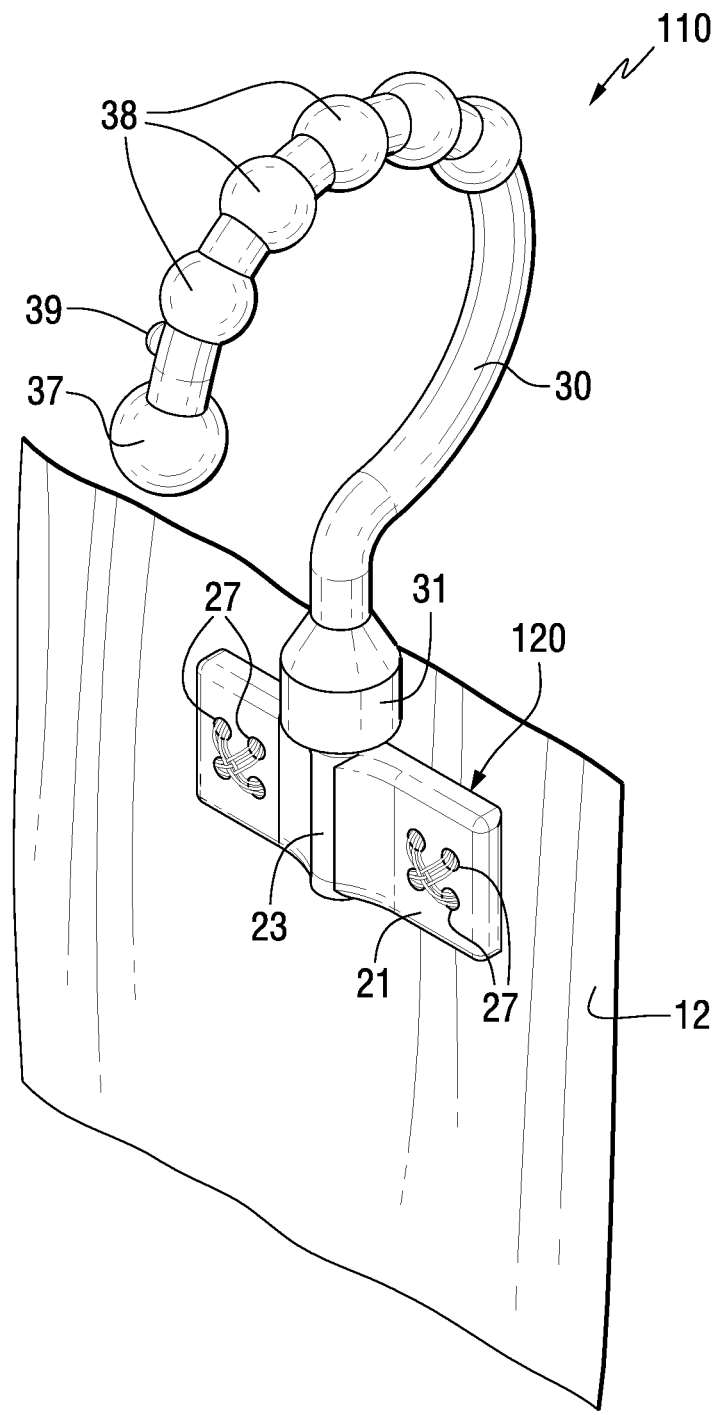
FIG. 13 is an isometric view of a curtain hook assembly in accordance with another embodiment of the present invention.

A curtain hook assembly 110 in accordance with another embodiment of the present invention is shown in FIG. 13. In this embodiment, the lower hook 40 is removed from the backing plate 120, while the components of the curtain hook 30 and remaining features of the backing plate 120 shown in FIG. 13 may be the same as the embodiment shown in FIGS. 1-12. In this embodiment, the backing plate 120 may be sewn or otherwise attached to the curtain 12 by means of threads extending through the mounting holes 27 through the backing plate 120.

Figure 14:
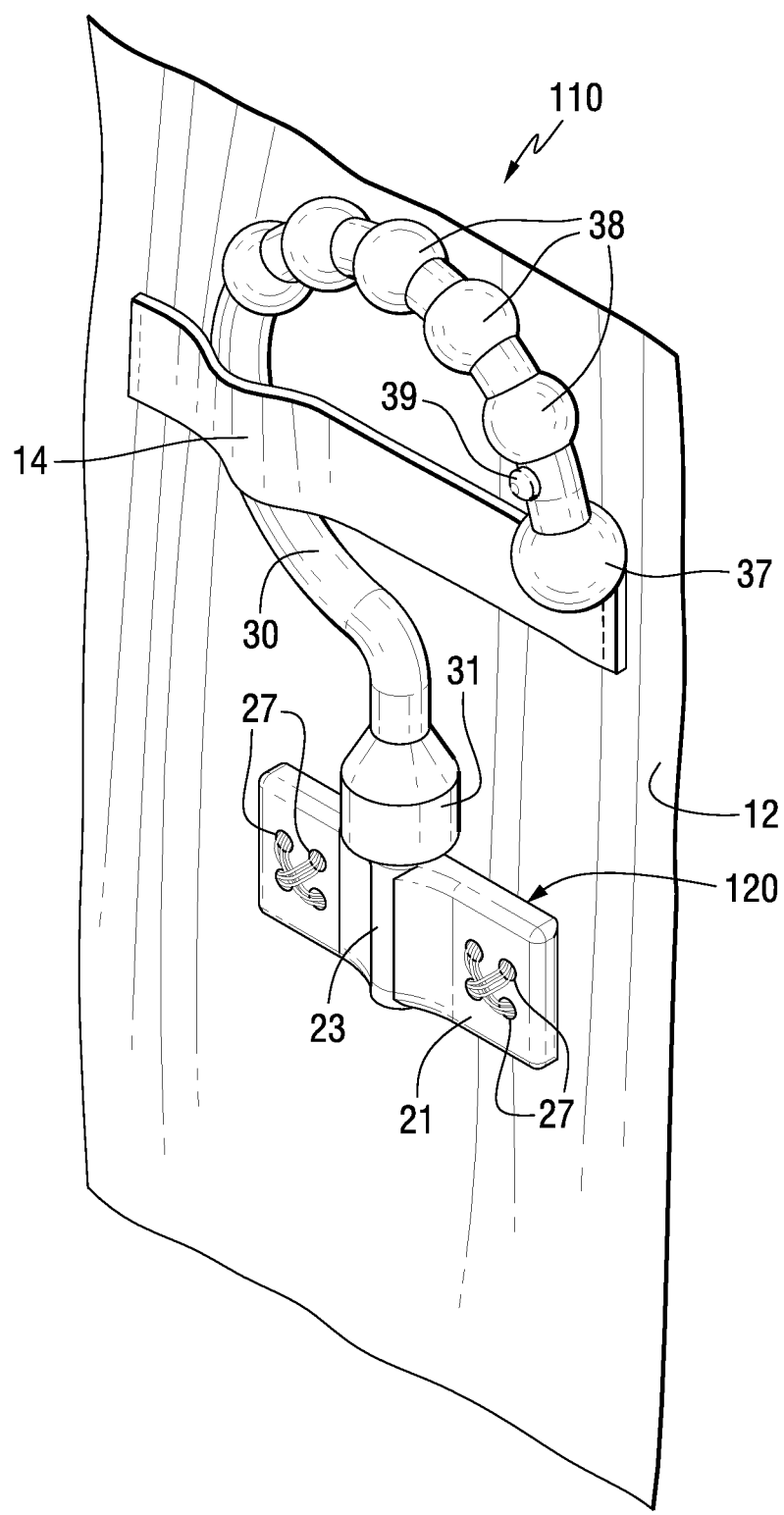
FIG. 14 is an isometric view of a curtain hook assembly in accordance with a further embodiment of the present invention in which the curtain hook is oriented flat against the curtain.
Figure 15:
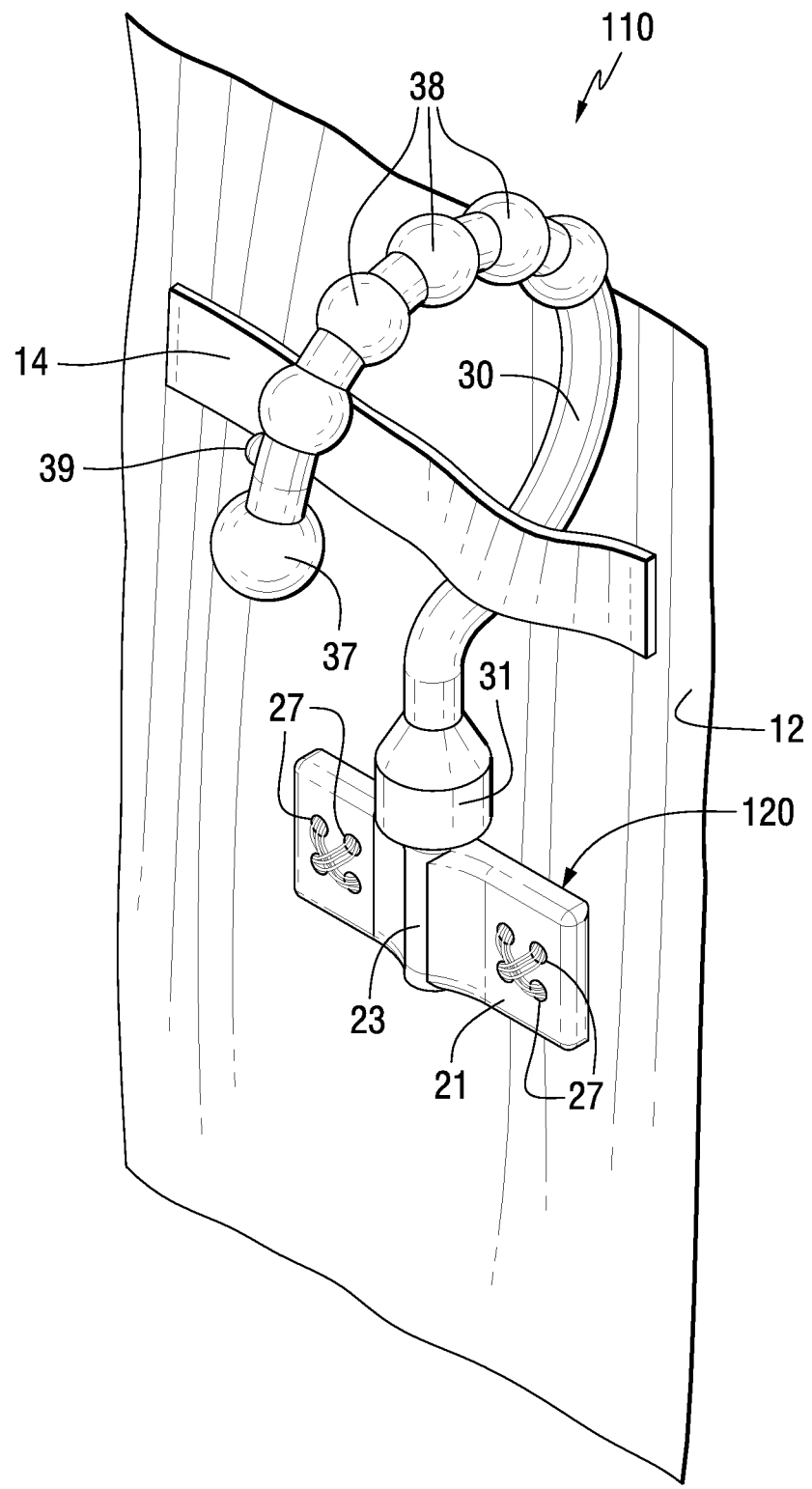
FIG. 15 is an isometric view of the curtain hook assembly shown in FIG. 14, with the curtain hook rotated from the flat position against the curtain to an extended position for mounting the curtain hook on a curtain rod.
Figure 16:
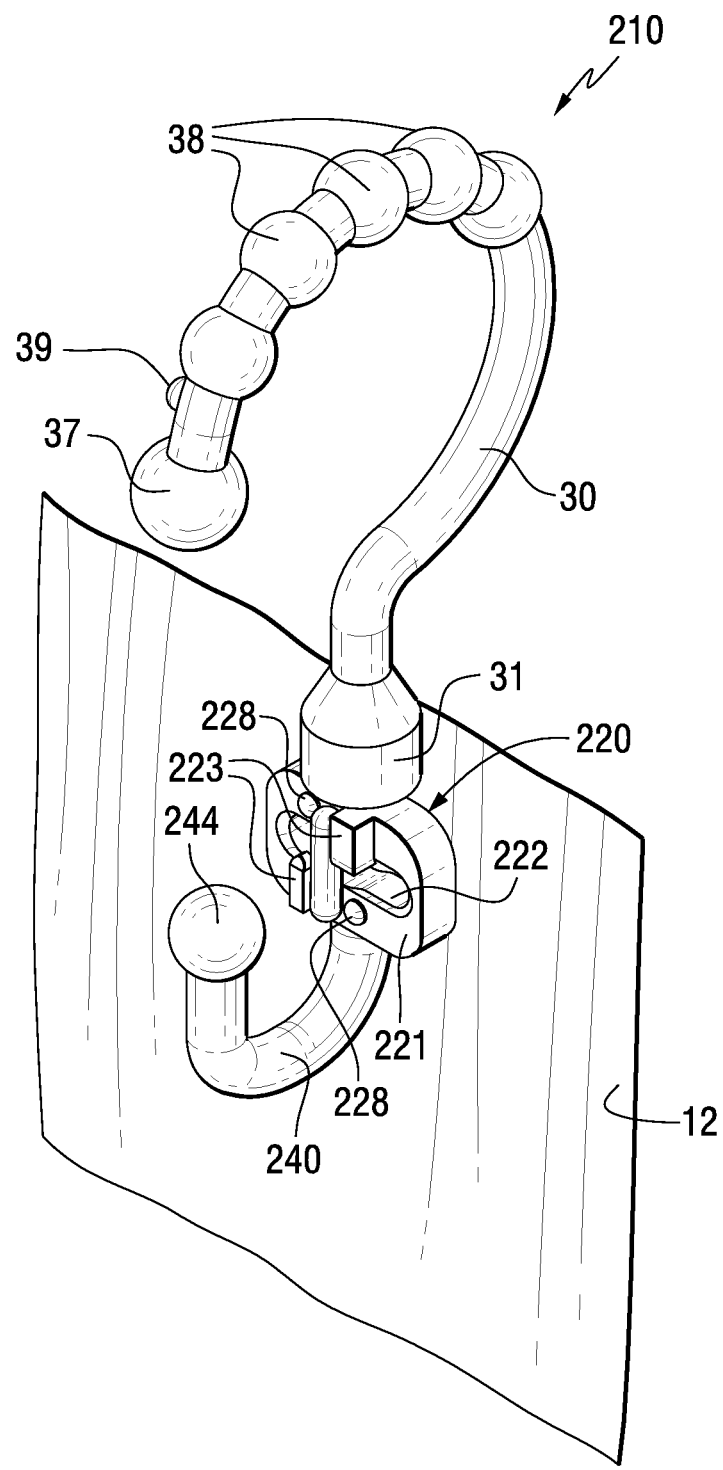
FIG. 16 is an isometric view of a curtain hook assembly in accordance with another embodiment of the present invention.
Figure 21:
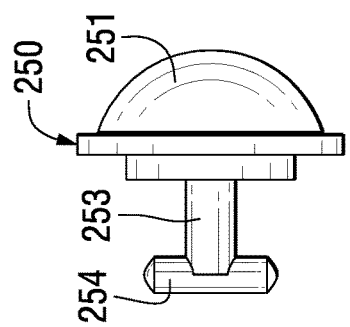
FIG. 21 is a top view of a locking button of the curtain hook assembly of FIG. 16.

FIGS. 14 and 15 illustrate a curtain hook assembly 110 as shown in FIG. 13, but with an upwardly extended portion of the curtain 12 including a retainer loop 14 attached thereto by means of sewing, adhesive or the like. In FIG. 14, the curtain hook 30 lies flat against the curtain 12, e.g., when the curtain hook assembly 112 is packaged. In FIG. 15, the curtain hook 30 has been rotated 90° around a vertical axis to a position where the curtain hook 30 is substantially perpendicular to the curtain 12. Thus, the curtain hook 30 is rotatable from a retracted position in which a plane defined by the curtain hook 30 is substantially parallel with a plane defined by the curtain 12 to an extended position in which the plane defined by the curtain hook 30 is substantially perpendicular to the plane defined by the curtain 12. In the extended position shown in FIG. 15, the upper portion of the curtain 12 is retained near the curtain hook 30 by means of the retainer loop 14. When the curtain hook 30 is in the position shown in FIG. 15, and mounted on a curtain rod (not shown), the retainer loop 14 helps to maintain the upper portion of the curtain 12 in an upright position to thereby partially or totally cover the curtain hook 30 from viewing from the front of the curtain 12. The retainer loop 14 also helps to secure the curtain 12 flat against the hook 30 when in the position shown in FIG. 14.

The retainer loop 14 may have a typical length that is matched to the width of the hook 30 as measured in a plane defined by the hook 30, e.g., as can be seen in FIG. 14. For example, the length of the retainer loop 14 may be from 50% to 150% of the width of the hook 30, or from 80% to 120%, or from 90% to 110%. The retainer loop 14 is typically located at a height on the curtain corresponding generally to a midpoint of the hook, e.g., as shown in FIG. 14. For example, the retainer loop 14 may have a width and the midpoint of the hook 30 may lie within the width or slightly above the retainer loop 14.

FIGS. 16-23 illustrate a curtain hook assembly 210 in accordance with another embodiment of the present invention. The curtain hook assembly 210 includes a slotted backing plate 220 with a front face 221 and a slot 222 extending therethrough. Extended stop tabs 223 extend from the front face 221 of the slotted backing plate 220. Locking projections 228 extend from the front face 221 of the slotted backing plate 220.

A generally cylindrical upper connecting pin 224 extends upward from the slotted backing plate 220. Upper resilient securement tabs 225 are provided at the top of the upper connecting pin 224. The curtain hook 30 is rotatably connected to the slotted backing plate 220 by means of the upper connecting pin 224 and upper resilient securement tabs 225 extending into the retaining cup 31 of the curtain hook 30. The retaining cup 31 shown in the embodiment of FIGS. 16-23 is similar to the retaining cup 31 shown in the previous embodiments.

A generally cylindrical lower connecting pin 226 extends from the bottom of the backing plate 220. Lower resilient securement tabs 227 are provided at the bottom of the lower connecting pin 226. The lower hook 240 is rotatably attached to the slotted backing plate 220 by means of a lower retaining cup 241 having a tab-receiving region 242 and restricted opening 243. Thus, the lower hook 240 is rotatable from a retracted position in which a plane defined by the lower hook 240 is substantially parallel with a plane defined by the curtain 212 to an extended position in which the plane defined by the lower hook 240 is substantially perpendicular to the plane defined by the curtain 212. A side opening 245 is provided in the side of the lower retaining cup 241, which may be used to access the resilient securement tabs 227 if removal from the lower retaining cup 241 is desired and/or to facilitate manufacture of the lower retaining cup 241 and lower hook 240, e.g., during injection molding thereof.

As shown most clearly in FIGS. 17-23, the curtain hook assembly 210 includes a locking button 250 having a front face 251 and a back face 252. A generally cylindrical locking stud 253 extends from the back face 252 and includes T-shaped locking arms 254. While the front face 251 of the locking button 250 shown in this embodiment is generally hemispherical, it is to be understood that any other suitable shape or decoration could be used.

Figure 17:
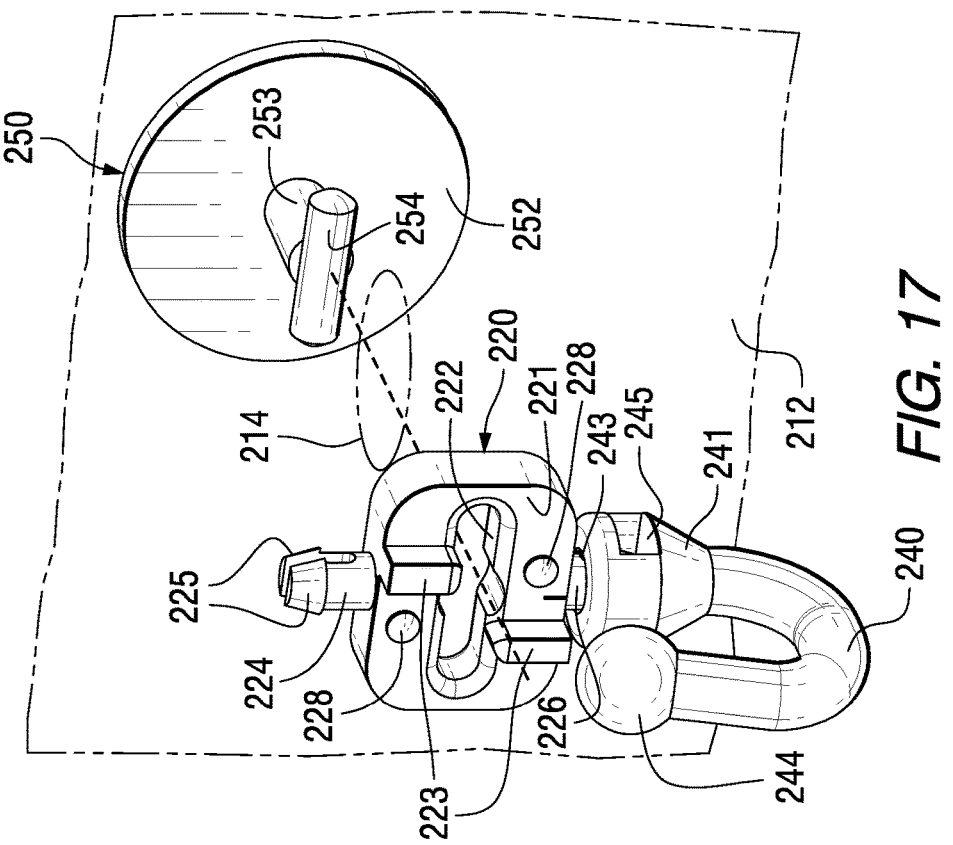
FIG. 17 is an exploded isometric view illustrating installation of the curtain hook assembly of FIG. 16 on a curtain.
Figure 19:
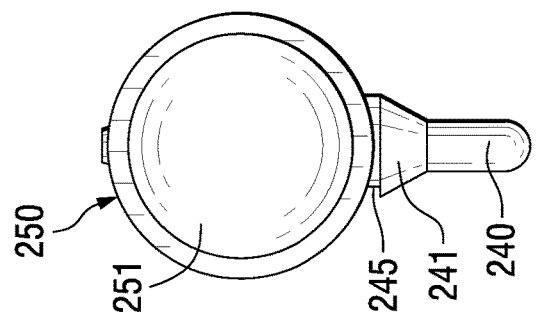
FIG. 19 is a front view of components of the curtain hook assembly of FIG. 16.
Figure 20:
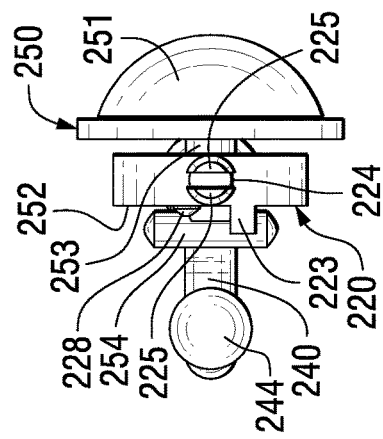
FIG. 20 is a top view of components of the curtain hook assembly of FIG. 16.
Figure 18:
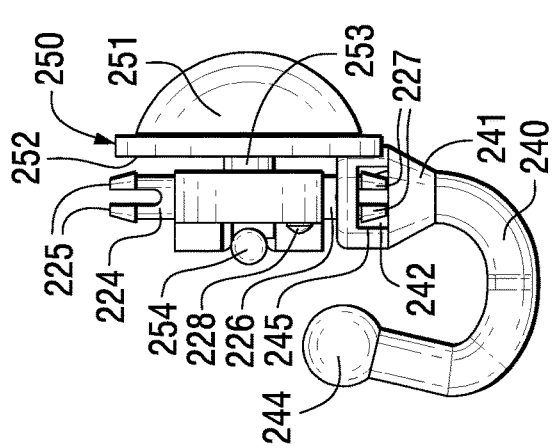
FIG. 18 is a side view of components of the curtain hook assembly of FIG. 16.
Figure 22:
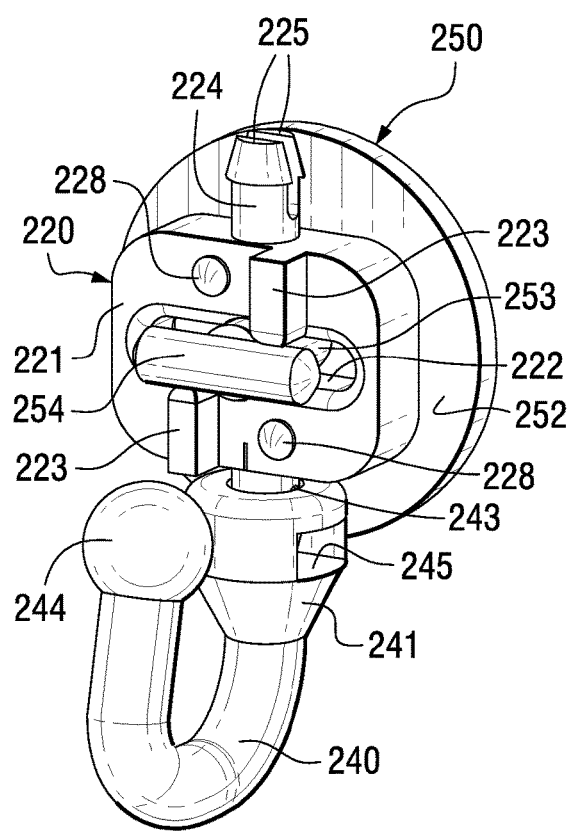
FIG. 22 is an isometric view of the backing plate, lower hook and locking button of the curtain hook assembly of FIG. 16.
Figure 23:
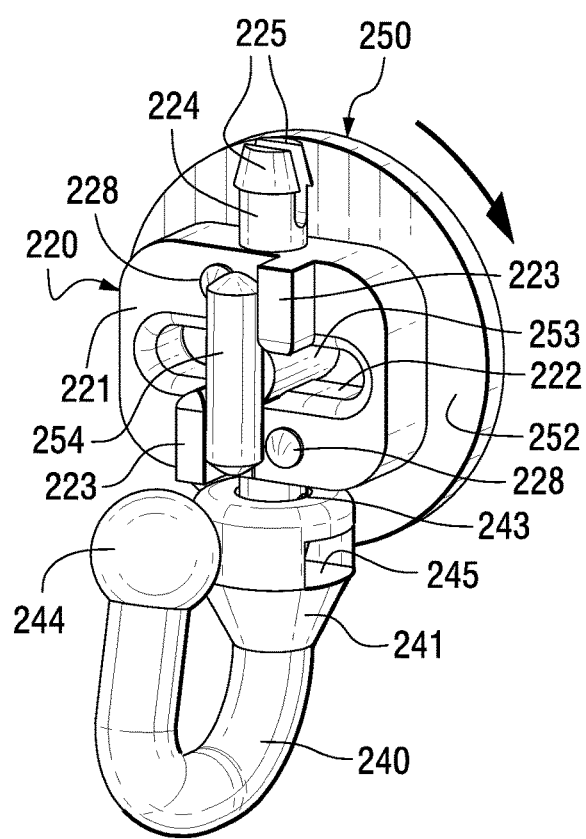
FIG. 23 is an isometric view of the backing plate, lower hook and locking button of FIG. 22, with the locking button rotated into a locking position with respect to the backing plate.

As shown most clearly in FIGS. 17, 22 and 23, the curtain hook assembly 210 may be secured to a curtain 212 by inserting the stud 253 and arms 254 through a slot 214 in the curtain 212. In the orientation shown in FIGS. 17 and 22, the locking arms 254 fit through the slot 222 of the slotted backing plate 220. Once the locking button 250 and locking arms 254 are in the position shown in FIG. 22, the locking button 250 may be rotated as shown by the arrow in FIG. 23 to a locking position in which the locking arms 254 travel past the locking projections 228 and abut against the extended stop tabs 223 of the slotted backing plate 220. In the locked position shown in FIG. 23, the button 250 is held in close proximity to the slotted backing plate 220 to thereby secure the curtain hook assembly 210 on the curtain 212.

The components of the hook assemblies described herein may be made of any suitable materials, including plastics, metals, metal-coated plastics, and combinations thereof. For example, the window and shower curtain hook assembly components may be made entirely of plastic, or the backing plates may be made of plastic and the upper curtain hooks may be made of metal or metal-coated plastic, e.g., in regions where the curtain hooks are visible from within a room in which the curtain is hanging.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A curtain and hook assembly comprising:
    a curtain;
    a backing plate secured to the curtain;
    a curtain hook rotatably mounted on and extending upward from the backing plate, wherein the curtain hook is rotatable from a retracted position in which a plane defined by the curtain hook is substantially parallel with a plane defined by the curtain to an extended position in which the plane defined by the curtain hook is substantially perpendicular to the plane defined by the curtain; and
    a lower hook extending downward from the backing plate, wherein the lower hook is rotatably mounted on the backing plate for rotation around a vertical axis of rotation from a retracted position in which a plane defined by the lower hook is substantially parallel with the plane defined by the curtain to an extended position in which the plane defined by the lower hook is substantially perpendicular to the plane defined by the curtain.

2. The curtain and hook assembly of claim 1, wherein the curtain hook is rotatably mounted on the backing plate by a connecting pin extending from either the backing plate or the curtain hook that is received within a retaining cup in either the curtain hook or the backing plate.

3. The curtain and hook assembly of claim 1, wherein the curtain hook is rotatably mounted on the backing plate by a connecting pin extending upward from the connecting plate that is received in a retaining cup adjacent a bottom portion of the curtain hook.

4. The curtain and hook assembly of claim 3, further comprising opposing resilient securement tabs at an upper end of the connecting pin that are retained within a tab-receiving interior region of the retaining cup, and the connecting pin extends through a restricted lower opening of the retaining cup.

5. The curtain and hook assembly of claim 4, wherein the opposing resilient securement tabs are removable from the retaining cup.

6. The curtain and hook assembly of claim 1, wherein the backing plate is secured to the curtain by an adhesive.

7. The curtain and hook assembly of claim 1, wherein the curtain comprises an upper extended portion having a retainer strip attached thereto, and the curtain hook is inserted into the retainer strip.

8. The curtain and hook assembly of claim 7, wherein the retainer strip has a length that is from 50 percent to 150 percent of a horizontal width of the curtain hook measured in a plane defined by the curtain hook.

9. The curtain and hook assembly of claim 1, wherein the backing plate is secured to the curtain by sewn threads.

10. The curtain and hook assembly of claim 1, wherein the backing plate is secured to the curtain by a button comprising a stud that passes through the curtain.

11. The curtain and hook assembly of claim 1, wherein the backing plate comprises a horizontal lower edge, and the lower hook extends downward below the horizontal lower edge of the backing plate.

12. A curtain hook for securing to a curtain comprising:
    a backing plate having a back face structured and arranged to contact the curtain and an upwardly extending connecting pin;
    a curtain hook rotatably mounted on the backing plate comprising a retaining cup adjacent a bottom portion of the curtain hook, wherein the connecting pin is received within the retaining cup to allow the curtain hook to rotate around an axis defined by the connecting pin and to retain the curtain hook from relative movement with respect to the backing plate along the axis of the connecting pin; and
    a lower hook extending downward from the backing plate, wherein the lower hook is rotatably mounted on the backing plate for rotation around a vertical axis of rotation from a retracted position in which a plane defined by the lower hook is substantially parallel with a plane defined by the back face of the backing plate to an extended position in which the plane defined by the lower hook is substantially perpendicular to the plane defined by the back face of the backing plate.

13. The curtain hook of claim 12, further comprising opposing resilient securement tabs at an upper end of the connecting pin that are retained within a tab-receiving interior region of the retaining cup, and the connecting pin extends through a restricted lower opening of the retaining cup.

14. The curtain hook of claim 13, wherein the opposing resilient securement tabs are removable from the retaining cup.

15. The curtain hook of claim 12, wherein the backing plate is secured to the curtain by sewn threads.

16. The curtain hook of claim 12, wherein the backing plate is secured to the curtain by a button comprising a stud that passes through the curtain.

17. The curtain hook of claim 12, wherein the backing plate comprises a horizontal lower edge, and the lower hook extends downward below the horizontal lower edge of the backing plate.

* * * * *